United States Patent
Barnhart

[11] 3,853,370
[45] Dec. 10, 1974

[54] SUN VISOR EXTENSION FOR VEHICLE

[76] Inventor: Nelle S. Barnhart, 3525 Turtle Creek Blvd., Apt. 2D, Dallas, Tex. 75219

[22] Filed: Aug. 27, 1973

[21] Appl. No.: 391,126

[52] U.S. Cl. ............................ 296/97 C, 296/97 G
[51] Int. Cl. ................................................ B60j 3/02
[58] Field of Search .... 296/97 G, 97 C, 97 K, 97 R, 296/95 C

[56] References Cited
UNITED STATES PATENTS

| | | | |
|---|---|---|---|
| 1,567,480 | 12/1925 | Wood | 296/97 G |
| 1,668,160 | 5/1928 | Lingner | 296/97 C |
| 2,134,414 | 10/1938 | Norcross | 296/97 G |
| 3,071,408 | 1/1963 | Turner | 296/97 C |
| 3,306,657 | 2/1967 | Turner | 296/97 C |

FOREIGN PATENTS OR APPLICATIONS

| | | | |
|---|---|---|---|
| 468,066 | 12/1951 | Italy | 296/97 C |

*Primary Examiner*—Stanley H. Tollberg
*Assistant Examiner*—John P. Shannon
*Attorney, Agent, or Firm*—Peter J. Murphy; Cecil L. Wood

[57] ABSTRACT

A clamping base is dimensioned to overlie one face of a vehicle main sun visor, and includes adjustable confronting flanges for clamping to the upper and lower edges of the visor. The clamping base includes an elongated slot extending between the flanges and having a lateral notch at the lower end and intermediate its ends. A generally rectangular visor extension includes a guide member confined in the slot to guide the extension between an overlying position and an extended position. Springs coupled between the visor extension and the base urge the extension to the overlying position, and the extension guide member is latched in either of the guide slot notches to retain the extension in the extended position.

5 Claims, 9 Drawing Figures

PATENTED DEC 10 1974
3,853,370
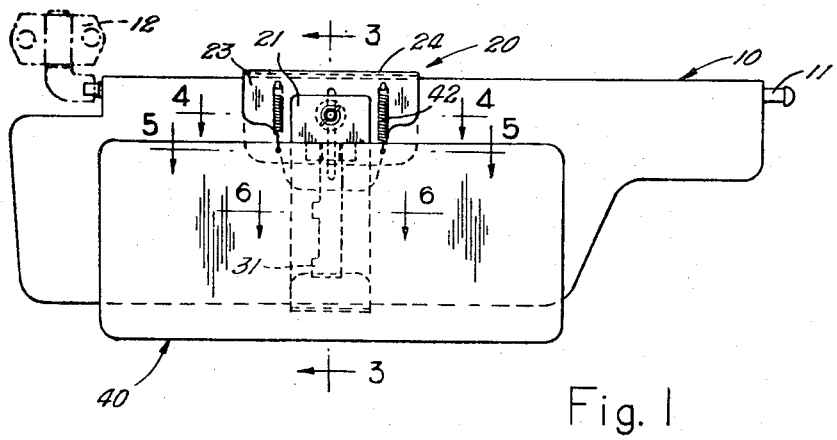
Fig. 1
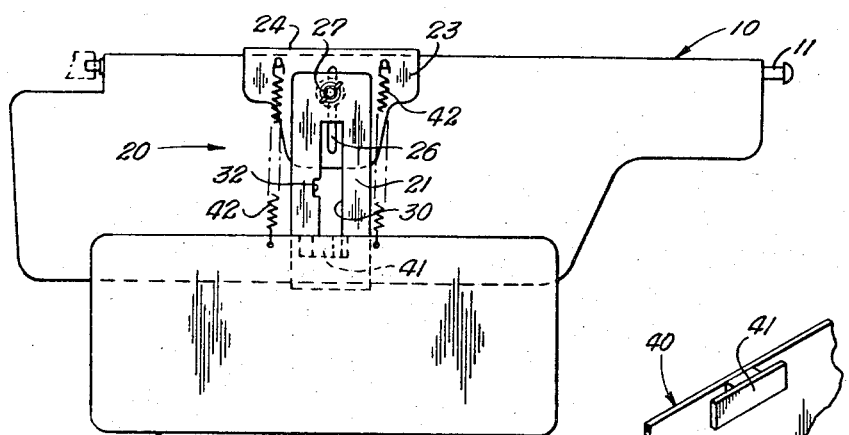
Fig. 2
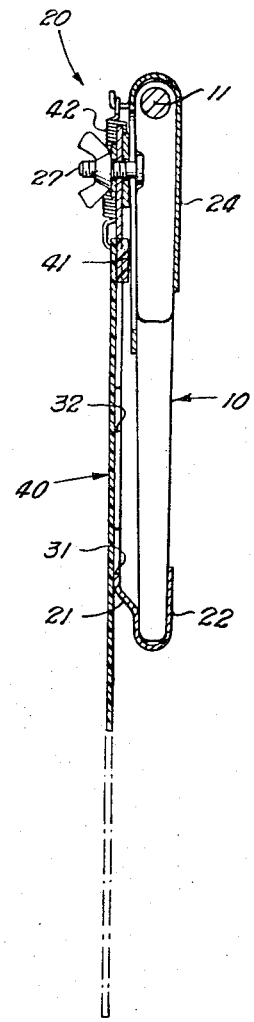
Fig. 3
Fig. 9
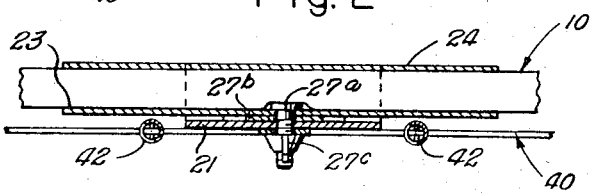
Fig. 4
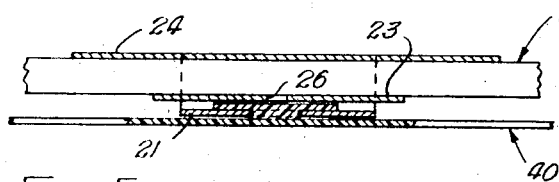
Fig. 5
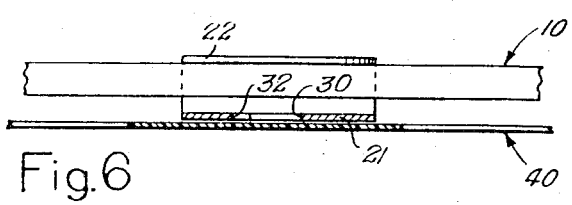
Fig. 6
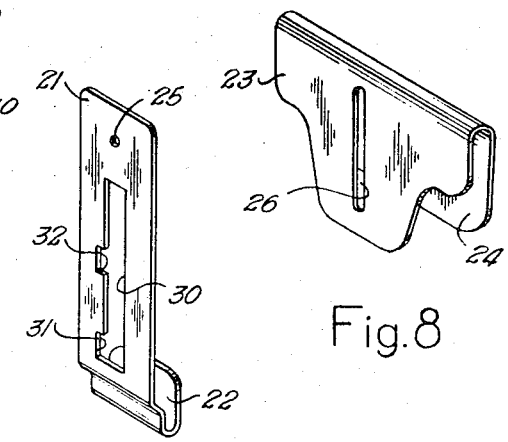
Fig. 7
Fig. 8

SUN VISOR EXTENSION FOR VEHICLE

BACKGROUND AND SUMMARY OF THE INVENTION

This invention relates to a sun visor extension for use with main sun visors which are conventionally installed in vehicles such as passenger vehicles, utility vehicles, trucks etc.; and more particularly to such a visor extension which is shiftable between a retracted and extended position, in a plane adjacent and parallel to that of the main visor.

The main sun visors which are conventionally installed above the windshield in passenger vehicles for example, are designed, as is to be expected, for a driver of average height; and such main visors are frequently not very effective or helpful for persons of less than average height. For such persons it is desirable to have a visor extension for use with the vehicle main visor which is readily and conveniently available to the driver or passenger; that is, an extension which may be readily pulled down relative to the main visor and define an extension of the lower edge main visor, and thereby being effective for the person whose line of vision is lower relative to the windshield.

It is also desirable to have such a visor extension for use by drivers or passengers of average height, which can be extended below the main visor at times when the vehicle is being driven toward the sun during times when the sun is relatively low on the horizon. A visor extension for this purpose should, of course, be transparent and preferably would consist of a transparent colored sheet.

It is also desirable to have a visor extension, preferably transparent, for use when the main visors are swung to shield the front side windows of the vehicle. In most cases the main visors are very ineffective with respect to the side windows, except at times when the sun is quite low on the horizon.

It is further desirable that an auxiliary visor be available which may be attached to the main visors of the vehicle in a manner that is quite secure, so that the auxiliary visor functions as if it were a permanently installed accessory for the vehicle; and of course such auxiliary visor should have an adjustable mounting so that it is readily attached to vehicle main visors of different size.

An object of this invention therefore is to provide a novel and useful visor extension for vehicles which is an accessory to be mounted on the vehicle main visor.

Another object of this invention is to provide such a visor extension which is securely mountable on a vehicle main visor and which is extended and retracted in a plane closely parallel to the plane of the main visor.

A further object of this invention is to provide a visor extension which moves in a plane closely parallel to the plane of the main visor and is readily and easily moved and latched between a retracted position generally overlying the main visor and an extended position.

For accomplishing these objects, visor extension includes a clamping base assembly consisting of two members adjustably coupled together, with the base assembly being dimensioned to span the width of a vehicle main sun visor and having confronting upper and lower flanges for engaging the opposite edges thereof. The base assembly has elongated guide track means extending between the clamping flanges, and includes latching means adjacent to the lower flange. A flat generally rectangular sheet has a guide member mounted thereon intermediate its ends and adjacent to its upper edge. The guide member coacts with the guide track means for guiding reciprocating movement of the sheet between an upper retracted position, generally overlying the vehicle sun visor, and a lower extended position, projecting beyond the lower edge of the sun visor. Resilient means connected between the base assembly and the sheet urge the sheet to the retracted position; and the guide member and latch means coact to selectively latch the guide member at the lower end of the track means to maintain the sheet in the extended position.

The novel features and the advantages of the invention, as well as additional objects thereof, will be understood more fully from the following description when read in connection with the accompanying drawings.

DRAWINGS

FIG. 1 is a face view of a vehicle main visor with a visor extension, according to the invention, mounted thereon in the retracted position;

FIG. 2 is a view similar to FIG. 1 showing the visor extension in the extended position;

FIG. 3 is a sectional view taken in the vertical plane 3—3 of FIG. 1;

FIG. 4 is a fragmentary sectional view taken in the horizontal plane 4—4 of FIG. 1, particularly illustrating the adjustable clamping base for the visor extension;

FIG. 5 is a fragmentary sectional view taken in the horizontal plane 5—5 of FIG. 4 particularly illustrating the mounting of the visor extension sheet on the clamping base;

FIG. 6 is a fragmentary sectional view taken in the horizontal plane 6—6 of FIG. 1;

FIGS. 7 and 8 are detail perspective views of the two members of the clamping base; and FIG. 9 is a fragmentary detail view of the guide member for the visor sheet.

DESCRIPTION OF THE PREFERRED EMBODIMENT

Referring to the drawings there is shown a main visor 10 which is illustrative of a conventional sun visor provided in vehicles such as passenger vehicles, including a hinge rod 11 and mounting bracket 12. The visor extension includes a base clamping assembly 20, for securing the visor extension to the main visor 10, and a sheet 40 which is supported on the clamping assembly 20 and defines the sun shield of the visor extension.

The width of the main visor 10 is different for different vehicles, and such width may vary from five to seven inches for example. The clamping base assembly 20 then is adjustable so that the visor extension may be mounted on main visors of different width, and mounted securely so that the visor extension will function as if it were a permanently installed accessory of the vehicle.

The visor sheet 40 may be fabricated of any suitable material, and may be either opaque or transparent as desired. Where the visor extension is to function principally in the manner of the main visor for persons who sit lower in the vehicle, it would be desirable that the visor sheet be opaque. On the other hand, where the visor extension is to function more as an auxiliary extension of the main visor, and especially for use when the sun is low on the horizon, the visor sheet should be transparent and may preferably be fabricated of a colored or tinted plastic material.

Referring now in detail to the base clamping assembly, this assembly consists of a lower elongated member 21 of sheet material, fabricated of metal or plastic for example, which is formed at its lower end to define a re-entrant flange 22 for engaging the lower edge of the main visor 10. This lower member 21 has a length to correspond generally to the width of the smallest main visor 10 to which the assembly may be attached. An upper member 23 is also fabricated from a sheet material, such as metal or plastic, and is formed to define a re-entrant clamping flange 24 for engaging the upper edge of the main visor 10. Reference to the upper edge of the main visor 10 refers to the edge which is uppermost when the visor is swung downward to the sun shielding position, as shown in the drawing, and this upper edge is the edge containing the hinge rod 11 by means of which the main visor is supported.

For adjustably securing these two members together, the lower member 21 is provided with a hole 25 adjacent its upper end; and the upper member 23 is provided with an elongated slot 26 transverse to the upper flange, with the members being secured together by a screw and wing nut assembly 27 which extend through the slot and hole. The assembly 27, as particularly illustrated in FIG. 4 includes a screw 27a, a spacer 27b, and wing nut 27c.

The lower member 21 of the base clamping assembly is provided with a guide track means in a form of an elongated slot 30 perpendicular to the lower flange 22 and extending generally between the flange 22 and the hole 25 for the wing nut assembly. The guide track slot includes a lateral recess or notch 31 at the lower end of the slot, and includes an additional lateral recess 32 intermediate the ends of the slot. This guide track slot 30 is for the purpose of guiding the reciprocating movement of the visor sheet 40; and for this purpose the visor sheet includes a guide member 41 which is secured to the sheet intermediate its ends and adjacent to the upper edge. This guide member may preferably be fabricated fron nylon or some similar self-lubricating material, may be integral with or securely attached to the visor sheet 40, and includes lateral retaining flanges for retaining the guide member within the guide track slot 30 during reciprocations thereof.

As illustrated in the drawings, the visor sheet 40 will have a width related to the length of the guide track slot 30 such that in the upper position of the sheet relative to the main visor 10 the sheet will generally overlie the main visor and extend below the lower edge of the main visor as sufficient distance to enable grasping of the sheet. In this upper position, which is referred to as a retracted position, the guide member 41 is disposed at the upper end of the guide track slot 30. The visor sheet is urged toward and retained in this retracted position by a pair of springs 42, which are connected between the upper clamping member 23 adjacent to the upper flange 24 and the upper edge of the visor sheet 40.

To move the visor sheet to the extended position relative to the main visor, the projecting lower edge of the visor sheet is gripped and merely pulled downward, with the guide member 41 then moving toward the lower end of the guide track slot 30. The guide member 41 includes a rectangular portion dimensioned to substantially fill the slot; and when the lower end of the slot is reached, the visor sheet is shifted to the left to engage the guide member 41 in the lower notch 31. The springs 42 of course are extended during this movement, and the frictional engagement of the guide member with the upper notch shoulder will retain the visor sheet in the fully extended position.

Should it be desired to only partially extend the visor sheet 40, the guide member may be engaged with the intermediate notch 32 of the guide track slot. If desired, of course, the guide track slot may be provided with more than two such notches.

For releasing the visor sheet to the retracted position, the visor sheet is simply grasped and moved laterally to the right to release the guide member 41 from the respective latching notch, and allowing upward movement of the sheet under the urging of the springs 42.

In the retracted position, the visor sheet substantially overlies the main visor; and the main visor may be pivoted to its stored position with minimal interference from the visor extension assembly. Also in this stored position of the main visor 10, the visor extension assembly is substantially hidden behind the main visor.

What has been described is a novel and unique form of visor extension for attachment to and use with main visors of passenger automobiles or other vehicles. A particular feature and advantage of this visor extension is that the visor sheet is simply and conveniently reciprocated between a retracted and extended position in a plane parallel to and closely adjacent to the plane of the main visor; and accordingly the visor sheet is easily and readily operated requiring a minimum of distraction of the driver. Another advantage of this arrangement is that the visor extension in a retracted position, is never in a position that it will interfere with the normal movements of the main visor 10.

Another feature and advantage of the described visor extension assembly is that, for a vehicle operator of less than average height the main visor 10 may be positioned permanently in the down or shielding position; and the visor sheet is in position to be readily moved between extended and retracted position in an easy and convenient manner, and that the vehicle operator only has to reach to the lower edge of the main visor to operate the visor extension.

While the preferred embodiment of the invention has been illustrated and described, it will be understood by those skilled in the art that changes and modifications may be resorted to without departing from the spirit and scope of the invention.

What is claimed is:

1. A visor extension comprising
a clamping base assembly consisting of at least two members adjustably coupled together, said base assembly being dimensioned to span the width of a vehicle sun visor and having confronting upper and lower flanges for engaging opposite edges thereof;
said base assembly having elongated guide track means extending between said clamping flanges, and latching means adjacent to the lower end of said guide track means;
a flat generally rectangular sheet having a guide member mounted therein intermediate the ends and adjacent to one edge defining its upper edge; said guide member coacting with said guide track means for guiding reciprocating movement of said sheet between an upper retracted position, generally overlying the vehicle sun visor, and a lower extended position, projecting beyond the lower edge of said sun visor;

resilient means connected between said base assembly and said sheet for urging said sheet to said retracted position; and said guide member and said latch means coacting to selectively latch said guide member at the lower end of said guide track means to maintain said sheet in said extended position.

2. A visor extension as set forth in claim 1
one of said members having an elongated slot perpendicular to its associated flange, the other of said members having a hole dimensioned to overlie said slot, and a threaded fastener assembly dimensioned to be received in said slot and hole for adjustably coupling together said clamping base members.

3. A visor extension as set forth in claim 1
one of said clamping base members being an elongated member having an elongated slot perpendicular to its associated flange and being generally coextensive with said member, said slot defining said guide track means; and said sheet guide member being dimensioned to be received and retained within said guide track slot.

4. A visor extension as set forth in claim 3
said guide track slot having a lateral notch at its lower end dimensioned to receive and latch said sheet guide member, said lateral recess defining said latching means.

5. A visor extension as set forth in claim 4
said guide track slot having at least one additional lateral notch intermediate its ends dimensioned to receive and latch said sheet guide member, said additional notch defining an additional latching means for latching said sheet in an intermediate extended position.

* * * * *